US005741202A

United States Patent [19]
Huber

[11] Patent Number: 5,741,202
[45] Date of Patent: Apr. 21, 1998

[54] SHIFT BY WIRE TRANSMISSION SYSTEM

[75] Inventor: Jon M. Huber, Laurinburg, N.C.

[73] Assignee: Meritor Heavy Vehicle Systems, LLC

[21] Appl. No.: 650,749

[22] Filed: May 20, 1996

[51] Int. Cl.⁶ .................................................. B60K 41/08
[52] U.S. Cl. ........................... 477/124; 74/336 R; 74/337; 477/110
[58] Field of Search ...................... 477/124, 111, 477/110, 107, 102, 101; 74/335, 336 R, 337

[56] References Cited

U.S. PATENT DOCUMENTS

| | | |
|---|---|---|
| 3,808,738 | 5/1974 | Siebers et al. . |
| 4,507,736 | 3/1985 | Klatt ............................. 364/424.1 |
| 4,598,374 | 7/1986 | Klatt ............................. 364/424.1 |
| 4,631,679 | 12/1986 | Klatt ............................. 364/424.1 |
| 4,648,290 | 3/1987 | Dunkley et al. .................. 477/124 |
| 4,690,008 | 9/1987 | Klatt ............................. 74/336 R |
| 4,850,236 | 7/1989 | Braun ............................. 74/337 |
| 5,239,894 | 8/1993 | Oikawa et al. . |
| 5,261,288 | 11/1993 | Menig ............................. 74/335 |
| 5,335,566 | 8/1994 | Genise et al. .................... 477/124 |
| 5,419,412 | 5/1995 | Schwab et al. .................. 180/336 |

*Primary Examiner*—Charles A. Marmor
*Assistant Examiner*—Sherry Lynn Estremsky

[57] ABSTRACT

A shift by wire transmission system enables a driver to manually select a next desired gear and the system completes the shift automatically without requiring the driver to operate the clutch. The system includes an electronic transmission control unit that communicates with an electronic engine control unit to control engine speed during a shift in order to synchronize the speed of an engine shaft and the transmission shaft. The driver manually chooses a gear shift by moving a shift lever to thereby produce electrical signals indicative of the desired change in gears. Multiple or skip shifting is possible along with a method of automatically choosing a default gear in the event that the vehicle transmission is placed in neutral while the vehicle is in motion.

9 Claims, 2 Drawing Sheets

SHIFT BY WIRE TRANSMISSION SYSTEM

BACKGROUND OF THE INVENTION

This invention generally relates to vehicle transmissions and, more specifically, to a shift by wire system for a manual transmission system in a heavy duty vehicle.

Heavy duty vehicles such as trucks typically include a multi speed transmission that is manually controlled by the driver. The driver utilizes a manual stick shift and clutch to select one of several transmission speeds depending upon the driving conditions, for example. The manual stick shift allows the driver to select from the various transmission speeds, which vary the ratio between the input speed to the transmission from the engine and the output speed of the transmission.

Modern heavy duty vehicles include transmissions that have in excess of ten speeds. Smoothly shifting the transmission between the various speeds is relatively complex and can prove extremely difficult. A typical shifting operation can be described as follows. First, the driver actuates the clutch to release or break the torque imposed on the transmission from the engine. After the torque is released the operator is able to move gears within the transmission out of a current engagement position into a neutral gear position. The driver then must synchronize the speed of the engine with a speed necessary at the next selected speed ratio to achieve a constant speed ratio at the transmission output. In other words, the driver attempts to manually adjust the engine speed so that the speed ratio of the transmission and the engine will be relatively constant once the new speed ratio is engaged. Such an operation requires extensive experience and familiarity with a vehicle in various driving conditions to achieve a smooth transition between gear ratios. Next, the driver typically re-engages the clutch and attempts to engage the desired gear.

The task of shifting gears in conventional trucks is even more complicated because the transmission output speed changes throughout the shifting procedure, which makes synchronizing the engine and the transmission speeds extremely difficult. Typically the engine and transmission speeds cannot be accurately synchronized and the driver must repeatedly use the clutch in attempting to complete a successful shift. Further, as modern vehicles become equipped with more complex controls, drivers are required to perform even more complicated operation steps. Many drivers lack sufficient experience to accomplish the shifting, clutch operation and speed synchronization that is required.

Various systems have been proposed for alleviating the difficulties just described. Prior to this invention, however, many proposed systems have proven inadequate. One drawback associated with most proposed systems is that there are inadequate or no speed synchronization capabilities. Other systems fail to relieve the driver of the burden of manually operating the clutch. Still other systems require a relatively high amount of manual dexterity from the driver in order to be able to operate a manual stick shift.

Completely automatic transmissions are not suitable for most heavy duty vehicles because of cost considerations and, moreover, they do not enable a driver to select an operating gear. When driving heavy duty trucks, for example, an experienced driver must be able to choose an operating gear in order to ensure safe travel and peak truck performance.

This invention provides a system that overcomes the shortcomings and drawbacks of the proposed systems described above.

SUMMARY OF THE INVENTION

In general terms, this invention provides a method of controlling a manual vehicle transmission that includes a number of gears, a manually operable clutch, an electronic transmission control unit and an electronic engine control unit. First, a driver manually selects a next desired gear using a gear selector that produces an electrical selection signal indicating the next desired gear. The electronic transmission control unit then determines a desired transmission operation condition that corresponds to the desired gear. For example if the transmission is currently in third gear and the driver indicates a desire to shift into fourth gear, the transmission control unit predicts the engine speed and orientation of gears within the transmission that will be necessary to complete the shift. The transmission control unit then communicates with the engine control unit so that the engine control unit is aware of the desired transmission operation condition that corresponds to the next desired gear. The electronic engine control unit then automatically releases a torque imposed on the transmission by the vehicle engine without requiring the driver to operate the clutch. The transmission control unit then automatically places the transmission in a neutral condition. The transmission control unit then automatically adjusts the engine speed in order to establish a predetermined engine speed that corresponds to a synchronization speed for the next desired gear. The transmission control unit then automatically shifts the transmission into the next desired gear. The transmission control unit next re-establishes the torque from the engine to the transmission. Control of the engine and transmission are then returned to the driver.

The preferred method of selecting the next desired gear is accomplished by providing a driver with a shifting lever within the cab portion of the truck. The driver moves the shift lever in one of two directions to indicate an upshift or a downshift operation, as desired. The driver preferably is provided with the ability to indicate multiple shifts from a currently engaged gear.

A particularly advantageous feature of the method of this invention prevents accidental shifting or shifting outside of a reasonable operating range, given current engine and transmission speeds. The transmission control unit determines, preferably on a continuous basis, a currently engaged transmission gear. After the driver moves the shift lever to produce an electrical signal indicating the next desired gear, the transmission control unit determines whether the next desired gear is within a range of available gears, given the currently engaged gear. If the next desired gear is within the range of currently available gears, then the transmission control unit completes the shift generally as described above.

Another advantageous feature of this invention is that the transmission control unit is programmed to automatically select a gear after the transmission is put in neutral while the vehicle is in motion. The electronic transmission control determines when the transmission is in a neutral gear and the vehicle is moving. Then the control unit determines the current engine status, including engine speed. The driver uses a shift lever to indicate whether it is preferable to accelerate the vehicle or to permit it to coast. The electronic transmission control then automatically engages a gear depending upon the current engine condition and the choice made by the driver.

These and other features and advantages of this invention will become apparent to those skilled in the art from the following detailed description of the preferred embodiment.

DETAILED DESCRIPTION OF THE PREFERRED EMBODIMENT

Figure 1:
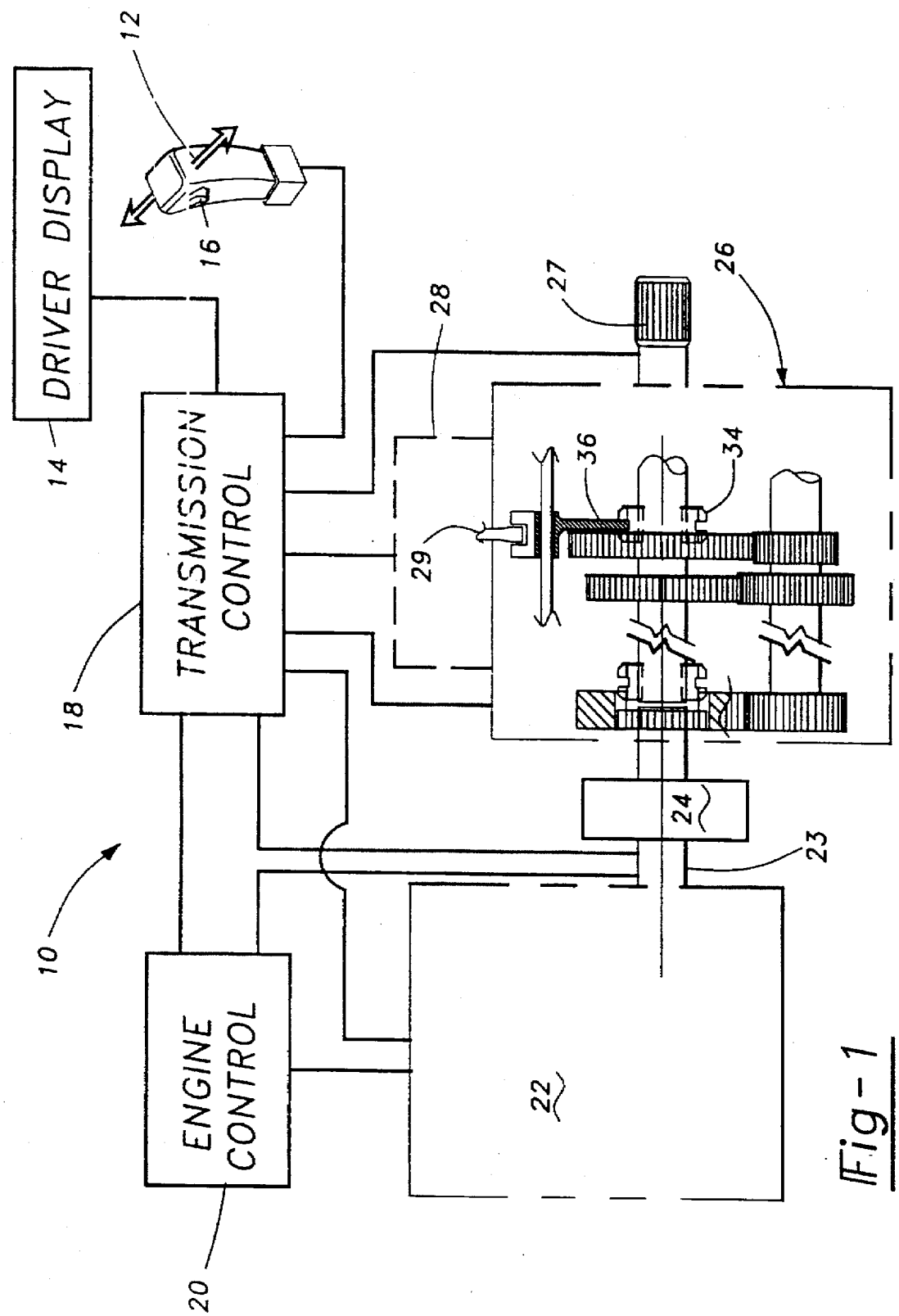
FIG. 1 is a schematic illustration of a shift by wire transmission system designed according to this invention.

FIG. 1 schematically illustrates a shift by wire transmission system 10. A shift lever 12 is mounted in a convenient place within the cab so that the driver is able to move the shift lever 12 forward or backward to indicate upshifts and downshifts, respectively. A driver display 14 is provided that indicates the currently engaged gear of the transmission. Display 14 can include a conventional LCD or LED read out, for example. A function button 16 is provided on the lever 12 for reasons to be described in more detail below.

An electronic transmission control unit 18 is coupled to an electronic engine control unit 20. The engine control unit is utilized to control an engine 22 in a manner known in the art. The transmission control unit 18 is primarily responsible for effecting automatic gear shifts within the transmission as will be described below.

The engine 22 has an output shaft 23 connected through a manually operable clutch 24 to a multi-speed transmission 26. The transmission 26 has an output shaft 27. A shifting module 28 is provided, preferably on top of the housing of the transmission 26 in order to effect the mechanical changing of gears within the transmission 26. The transmission 26 is a conventional multi-speed transmission. The shifting unit or module 28 can be any mechanical arrangement that shifts gears in response to electrical signals from the transmission control unit 18. The presently preferred embodiment includes a shifting unit 28 that is commercially available in Europe from WABCO Westinghouse Fahrzeugbremsen GmbH of Germany. The shift unit 28 includes a portion 29 that extends out of the shift unit 28 and into the transmission housing of the transmission 26. The shift unit 28 mechanically changes gears within the transmission 26 in a manner similar to a manual stick shift. Details of the shift unit 28 need not be provided in this specification.

Figure 2:
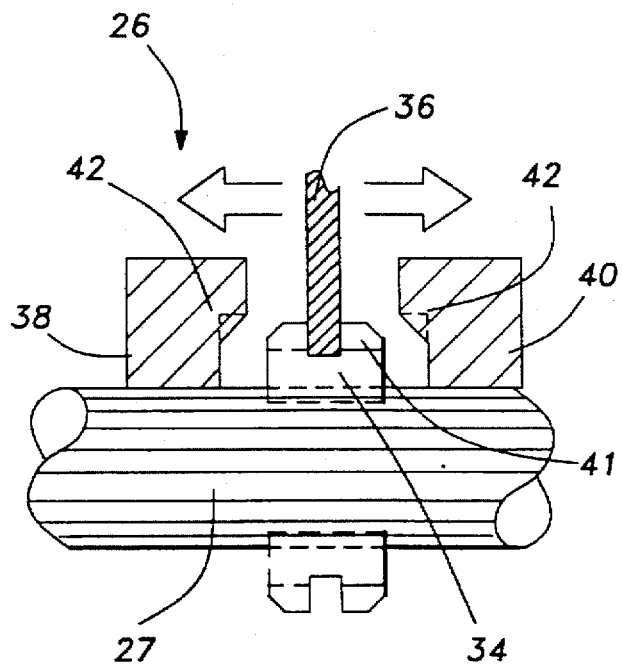
FIG. 2 is a diagrammatic illustration of selected portions of the embodiment of FIG. 1.

The shift unit 28 effects gear changes within the transmission 26 in the following general manner. Collar 34 is moved through yoke 36, which in turn is coupled to the moving member 29 of the shift unit 28. Accordingly, yoke 36 is moved by movements of the moving member 29. The collar 34 is shown in FIG. 2 in a neutral position where it is not engaged with either of the gears 38 or 40. In the illustrated example, collar 34 has teeth 41 positioned axially that are selectively brought into engagement with mating teeth 42 on one of the gears 38 or 40. The collar 34 rotates together with, and at a speed proportional to, the output shaft 27. The gears 38 and 40 are driven by the engine 22 at different speed ratios. By moving the collar 34 into engagement with one of the two gears 38 and 40, the driver is able to select different speed ratios. The particular structure of the transmission 26 is not part of this invention, but rather has been described as general background information and to help illustrate various aspects of this invention.

While the collar 34 is not engaged to one of the gears 38 or 40, the shaft 27 is not being driven by any of the gears. Instead, the gears 38 and 40 are rotating at a speed dependent upon the input speed from the engine shaft 23 combined with their individual gear ratios. Therefore, as the collar 34 approaches one of the gears and teeth 41 approach teeth 42 it is likely that they are rotating at very different speeds. In conventional systems, the driver had to actuate the clutch in order to brake transmission of such rotation of the gears while also attempting to synchronize the speed of the engine through manual throttle control, to the speed of the transmission shaft. Such operations in conventional systems, depended upon the driver's experience and abilities. One aspect of this invention is that it ensures that the selected gear 38 or 40 is rotating at approximately the same speed as the collar 34 such that the gear engagement will proceed smoothly.

When it is desirable to shift gears, the driver moves the shift lever 12 forward to indicate an upshift or backward to indicate a downshift. Such movement of the shift lever 12 causes an electrical signal to be generated that is interpreted within the transmission control unit 18 as indicating whether an upshift or downshift is desired. Although the illustrated embodiment includes a shift lever 12, other switching or signal producing arrangements come within the scope of this invention. The actual execution of the shift is then accomplished automatically, primarily through the transmission control unit 18, responsive to the indication signal generated by moving the shift lever 12. Therefore, the driver is relieved of the need to operate the clutch or to attempt to match speeds between the engine and the transmission by utilizing the accelerator pedal during a shift. In a system designed according to this invention, the manually operable clutch 24 is utilized by the driver preferably only when initially starting the vehicle and stopping the vehicle.

As illustrated, the shift lever 12 requires no mechanical connection with the transmission 26. The shift lever 12 simply generates electrical signals indicating a desired shift that are interpreted and utilized by the transmission control unit 18. The function button 16 provided on the shift lever 12 is an electrical switch that provides a means for the driver to indicate that reverse gear is desired. Reverse gear is available only when shifting from a neutral gear. The function button 16 is also used to indicate the desire for a skip-shift up or down one range. A skip-shift range can include, for example, shifting two or more gears at one time, such as from third gear to fifth gear (effectively bypassing fourth gear). The driver display 14 preferably indicates to the driver the range of available gears along with indicating the currently engaged gear.

The transmission control unit 18 continuously monitors the current transmission status through a plurality of sensors. The preferred embodiment includes at least four inductive position sensors. One sensor is utilized for determining the rail selection within the transmission, another the collar position, a third the range piston position (in embodiments having a compound transmission position with an auxiliary gear box) and a fourth for indicating the clutch position. Such sensors are commercially available and the presently preferred embodiment includes sensors available from WABCO in Germany.

During normal shifting operations, the driver need not manually operate the clutch 24. In order to choose between forward and reverse gears, however, the clutch 24 must be depressed and the vehicle must be at rest. To select forward from neutral, the shift lever 12 should be moved forward and then released. To select reverse gears from neutral, the function button 16 should be depressed and the shift lever 12 should be moved rearward and then released. Neutral is selected by depressing a neutral button (not illustrated), which can be incorporated on the shift lever 12 or near the driver display 14, depending on the application. In the presently preferred embodiment, a shift that results in a change in direction (i.e., reverse to forward or forward to reverse) requires that the driver put the transmission into neutral before the system will automatically engage the new gear.

One feature of this invention includes automatically selecting a starting gear. For example, when the driver selects a forward gear from neutral, such as when the vehicle has stopped after moving forward, a default starting gear is automatically selected by the transmission control unit 18 and indicated on the driver display 14. In the event that the driver desires a different starting gear, the shift lever 12 can be manually pivoted forward to choose a higher gear or pivoted rearward to choose a lower gear than the default starting gear. In the presently preferred embodiment, the transmission control unit is programmed to choose second gear as the default starting gear.

Figure 3:
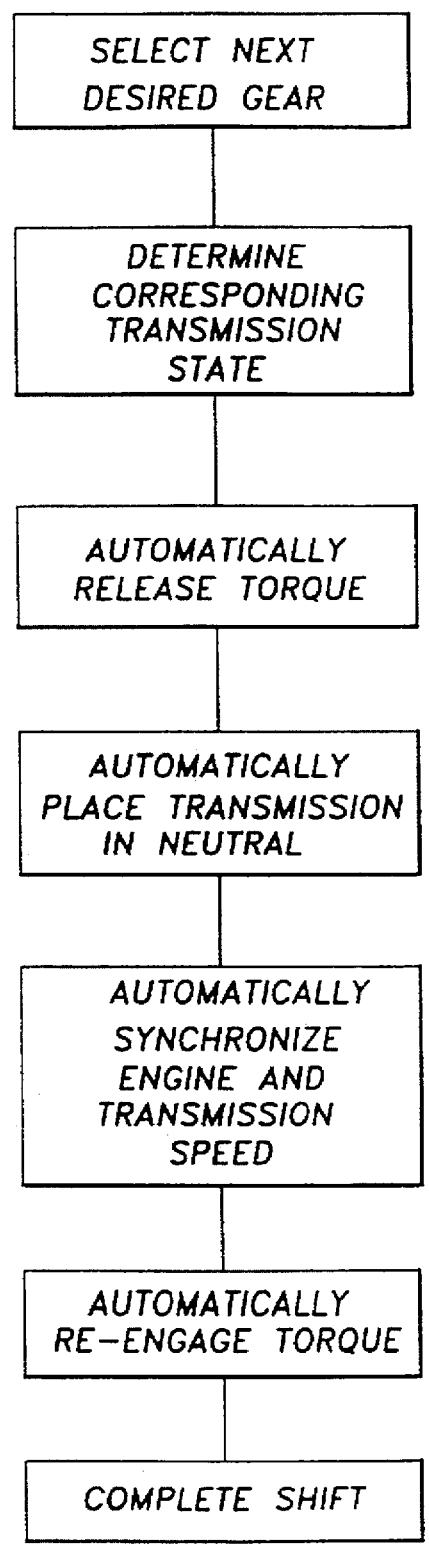
FIG. 3 is a flow chart diagram of the methodology associated with this invention.

With reference to FIG. 3, the general mode of operation for shifting gears while driving a vehicle will be described. The driver moves the shift lever forward, for example to complete an upshift, to thereby create an electrical signal that is indicative of an upshift. This electrical signal can be processed within a microcontroller located near the shift lever 12 or can be processed initially within the transmission control unit 18. In any event, the transmission control unit 18 receives an electrical signal that is indicative of a desired shift. The transmission control unit 18 then determines what the next desired gear is and the required engine and transmission operation parameters to complete that shift. The results of this determination are communicated to the engine control unit 20. The engine control unit 20 then releases or breaks the torque from the engine 22 provided through the engine shaft 23.

There are several ways of breaking the torque from the engine 22. In one known method, for example, the amount of torque is monitored through sensors and the engine speed is controlled until the sensors indicate that the torque has been broken. Another proposed manner of breaking torque involves predicting the engine speed necessary to break the torque, given information regarding variables such as current engine speed, the currently engaged gear and the direction of shift a driver wishes to complete. Such a system is described in U.S. patent application Ser. No., 08/508,156 filed on Jul. 27, 1995, and entitled "Combined System For Assisting Shifting Of Manual Transmission." The specific method of breaking torque can be varied, however, it is preferred to use a methodology that includes predicting the engine speed that will effect an appropriate torque break.

While the torque is released, the transmission control unit initiates the shift. The transmission control unit 18 communicates with the shifting unit 28 in order to move the collar 34 out of engagement with the gears corresponding to the previously engaged gear. At this time the control unit 18 places the system in neutral and then initiates an engine speed control mode. The transmission control unit 18 preferably determines, beforehand, the synchronized engine speed that will be needed to complete the shift. The transmission unit then causes the engine to operate at the synchronized speed. Next, the transmission control unit 18 indicates to the shift unit 28 to complete the shift by moving the collar 34 into engagement with the next desired gear. Upon completing the shift, the transmission control unit 18 communicates with the engine control unit 20 that the shift has been completed and the engine control is then surrendered to the engine control unit 20 and the driver. This operation is described in flow diagram form in FIG. 3.

The division of responsibilities between the transmission control unit 18 and the engine control unit 20 can be varied. It is most preferred, however, that the transmission control unit 18 be responsible for effecting the majority of the changes so that the transmission control unit 18 can more readily constantly monitor the currently engaged gear within the transmission 26. An alternative way of providing constant monitoring of a currently engaged gear is to provide sensors that indicate the positions of the various collars, yokes and gears within the transmission 26 and the moving parts within the shift unit 28, which produce signals that indicate the currently engaged gear.

The transmission control unit 18 preferably communicates with the engine control unit 20 through a communication link that corresponds to the SAEJ1939 industry standard. This standard, for example, limits the update rate for controlling the engine torque to fifty millisecond intervals. It is most preferred that the software for controlling the engine 22 is located within the engine control unit 20, however, the transmission control unit 18 can and preferably does control the engine speed during a shifting operation as described above.

Controlling the engine speed can be accomplished in a manner understood by one skilled in the art. Preferably, the transmission control unit 18 is programmed with suitable software. For example, engine speed can be controlled by controlling the throttle and the amount of fuel provided to the engine during a shifting operation.

When a driver desires to shift more than one gear at a time the gear shift lever 12 is moved simultaneous with depressing the function button 16. In the event that the desired shift would result in an overspeed or underspeed engine condition, the system 10 will not attempt to execute the shift. If a requested gear was indicated by skip-shifting, for example, by depressing the button 16 while moving the shift lever 12, the system will execute as many shifts as possible in the indicated direction. The shifts are completed in the general manner described above. In the event that not even one gear is possible in the chosen direction (i.e., upshift from the highest gear or downshift from first gear) the system 10 will not execute a shift and, instead will sound an audible alarm indicating to the driver that the shift has not been completed.

An additional advantageous feature of this invention is providing for situations where the vehicle is in neutral due to abnormal or unexpected operation. Two examples of how the vehicle could be undesireably placed in neutral include the driver manually selecting neutral while moving, or accidentally depressing the clutch during a shift by wire shift, which would result in the shift being missed and the transmission being left in neutral. The action taken by the transmission control unit 18 depends upon the operator's intention following engagement of the next gear.

Assume that the driver wishes the vehicle to coast after a new gear is engaged. The driver communicates this intention to the transmission control unit 18 preferably by moving the shift lever 12 rearward. Since the transmission control unit 18 is already aware that the vehicle is in motion and in neutral, it determines that the rearward movement of the shift lever indicates that a gear should be selected that will permit the vehicle to coast after the gear is engaged. Upon receiving the appropriate signal, the transmission control unit 18 automatically effects a shift that results in a gear being engaged that produces the highest rotations per minute that would be acceptable, given current engine speed and vehicle speed, for example.

Assume now that the driver wishes to accelerate the vehicle after the gear engagement. In this event, the driver preferably moves the shift lever 12 forward. Since the transmission control unit is already aware that the vehicle is in motion and currently in neutral, it interprets the electrical signal generated by forward movement of the shift lever 12 as instructing it to automatically effect a shift into a gear that produces the lowest possible rotations per minute that is also greater than a rotations per minute value corresponding to peak torque for the chosen gear. The determination of which gear best fits within those criteria, given current vehicle speed and other variables, is made by the transmission control unit 18.

Additionally, for embodiments including compound transmissions that require range shifts to engage an auxiliary transmission, the transmission control unit 18 is programmable to automatically complete a range shift at preselected road speeds while the vehicle is coasting in neutral gear.

The presently preferred embodiment of this invention has been described. Those skilled in the art will realize that variations and modifications are possible that do not necessarily depart from the scope and spirit of this invention. Therefore, the following claims should be studied to determine the true scope and content of this invention.

What is claimed is:

1. A method of controlling a manual vehicle transmission having a plurality of gears using an electronic transmission control unit, comprising the steps of:

(A) determining a condition when the vehicle is moving;
   (B) determining a condition when the transmission is manually placed into a neutral gear;
   (C) determining an engine condition when the conditions of steps (A) and (B) exist;
   (D) choosing a vehicle acceleration condition when the conditions of steps of (A) and (B) exist; and
   (E) automatically engaging one of the plurality of gears based upon the engine condition from step (C) and the vehicle acceleration condition chosen in step (D).

2. The method of claim 1, wherein step (C) includes determining a number of engine output shaft rotations per minute.

3. The method of claim 2, wherein step (D) is performed by choosing to have the vehicle accelerate from the condition of step (A) and wherein step (E) is performed by shifting the transmission into a selected gear that corresponds to an engine condition having a minimum number of engine shaft rotations per minute that is greater than a number of rotations per minute corresponding to a maximum torque value associated with the selected gear.

4. The method of claim 2, wherein step (D) is performed by choosing to have the vehicle coast in the condition of step (A) and wherein step (E) is performed by shifting the transmission into a gear that corresponds to an engine condition having a maximum number of engine shaft rotations per minute that is within a predetermined range of engine parameters.

5. The method of claim 4, wherein the predetermined range of engine parameters is determined by the electronic transmission controller, based on a set of variables including the engine condition of step (C).

6. The method of claim 1, wherein steps (A) through (C) and (E) are performed by the electronic transmission control unit.

7. The method of claim 1, wherein step (D) is performed by a user manually indicating a chosen acceleration condition to thereby generate an electrical signal indicative of the chosen acceleration condition.

8. The method of claim 1, wherein step (E) is performed the substeps of automatically establishing an engine torque on a portion of the transmission that corresponds to the gear to be engaged;
   automatically establishing an engine speed that corresponds to the gear to be engaged; and
   automatically shifting the transmission into the gear.

9. A method of controlling a manual vehicle transmission having a plurality of gears using an electronic transmission control unit, comprising the steps of:

(A) determining a condition when the vehicle is moving;
   (B) determining a condition when the transmission is in a neutral gear;
   (C) determining an engine condition by determining a number of engine output shaft rotations per minute when the conditions of the steps (A) and (B) exist;
   (D) choosing to have the vehicle accelerate from the condition of step (A) when the conditions of steps (A) and (B) exist; and
   (E) automatically engaging one of the plurality of gears by shifting the transmission into a selected gear that corresponds to an engine condition having a minimum number of engine shaft rotations per minute that is greater than a number of rotations per minute corresponding to a maximum torque value associated with the selected gear.

* * * * *